United States Patent [19]

Keck

[11] 4,436,368

[45] Mar. 13, 1984

[54] MULTIPLE CORE OPTICAL WAVEGUIDE FOR SECURE TRANSMISSION

[75] Inventor: Donald B. Keck, Big Flats, N.Y.

[73] Assignee: Corning Glass Works, Corning, N.Y.

[21] Appl. No.: 288,925

[22] Filed: Jul. 31, 1981

Related U.S. Application Data

[63] Continuation-in-part of Ser. No. 803,772, Jun. 6, 1977, abandoned.

[51] Int. Cl.³ .............................................. G02B 5/172
[52] U.S. Cl. ................................... 350/96.33; 340/555
[58] Field of Search ...................... 340/555; 350/96.33, 350/96.29

[56] References Cited

U.S. PATENT DOCUMENTS

| | | | |
|---|---|---|---|
| 3,703,690 | 11/1972 | Ravenscroft | 350/96.30 |
| 3,823,996 | 7/1974 | Kompfner et al. | 350/96.33 |
| 3,869,194 | 3/1975 | Shiraishi et al. | 350/96.30 |
| 3,980,390 | 9/1976 | Yamamoto | 350/96.31 |
| 4,000,416 | 12/1976 | Goell | 350/96.33 |
| 4,062,618 | 12/1977 | Steensma | 350/966.33 X |
| 4,070,091 | 1/1978 | Taylor et al. | 350/96.33 |
| 4,134,642 | 1/1979 | Kapron et al. | 350/96.33 |
| 4,217,488 | 8/1980 | Hubbard | 350/96.33 |

Primary Examiner—John D. Lee
Assistant Examiner—Frank Gonzalez
Attorney, Agent, or Firm—W. S. Zebrowski; R. E. Kurtz

[57] ABSTRACT

A glass optical fiber has multiple cores and a cladding. The index of refraction of all cores is greater than the index of refraction of the cladding and the index of refraction of a first core is greater then the index of refraction of a second core. The change in the ratio of light loss from the first and second cores is detected to identify perturbations of the optical fiber before it reaches a level sufficient for a secure signal to be tapped.

21 Claims, 9 Drawing Figures

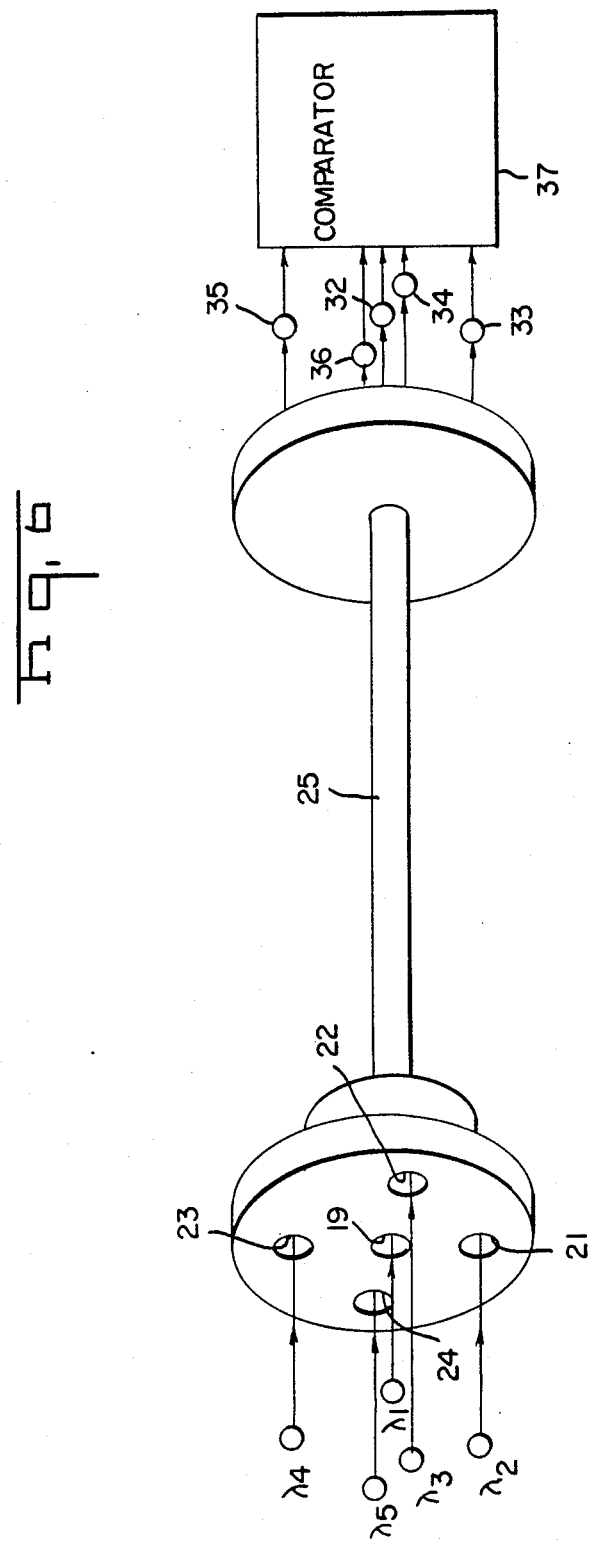

MULTIPLE CORE OPTICAL WAVEGUIDE FOR SECURE TRANSMISSION

This application is a continutation-in-part of application Ser. No. 803,772, filed June 6, 1977, now abandoned.

BACKGROUND OF THE INVENTION

This invention relates to optical waveguides and more particularly, to a multiple core optical fiber for use in a secure communication system.

The increased burden on communication systems has fostered the development of high capacity systems using optical waveguides. These optical waveguides are constructed of a transparent dielectric material such as glass. They consist of a central core surrounded by a cladding having an index of refraction less than that of the core. Light propagates along the waveguide. The theory of optical waveguides is contained in U.S. Pat. No. 3,157,726—Hicks et al and in a publication "Cylindrical Dielectric Waveguide Mode", by E. Snitzer, Journal of the Optical Society of America, Vol. 51, No. 5, pp. 491–498, May 1961.

Recently, however, optical waveguides having very low attenuation per unit length have been developed. For example, the Maurer and Schultz, U.S. Pat. No. 3,659,915, "Glass Optical Waveguide", describes an optical waveguide comprising a cladding layer of pure fused silica or doped fused silica and a core formed of doped fused silica. Germania and silica glass waveguides can also be used in accordance with U.S. Pat. No. 3,884,550. Single mode waveguides fabricated in accordance with Keck and Schultz, U.S. Pat. No. 3,711,262, are also suitable for use.

Optical waveguides having multiple cores are also known, one example being shown in U.S. Pat. No. 3,930,714.

In many communication systems, it is essential that the sender be able to recognize when his communications have been comprised. Normally, quiescent emanations from an optical waveguide are not detectable by an intruder. It is necessary for the intruder to perturb the waveguide, for example bend it, to enhance emanations from the waveguide so that the signal can be detected.

SUMMARY OF THE INVENTION

In accordance with this invention, a multiple core optical waveguide having differences in the indices of refraction between at least two of the cores is provided.

The multiple core waveguide of this invention is particularly suitable for use in a secure communication system where perturbation of the waveguide is detected before it reaches a level which is sufficient for the intruder to tap the secure signal.

The ratio of light loss from two cores of different indices of refraction, core diameters, and/or propagation wavelength is detected. A relative change in the light loss from the two cores identifies a perturbation of the optical fiber.

In one embodiment, the multiple cores are coaxial. In the preferred embodiment, one core is coaxial with the cladding and the remaining cores are arranged around the axis and within the cladding. This embodiment has particular advantages in a secure communication system because the cores arranged around the axis will detect a perturbation from any angle. Since the primary core, which is the coaxial core, is surrounded by the remaining cores, which are the secondary, or alarm cores, a secondary core will always be pertured in order to obtain perturbation of the primary core. This arrangement has other significant advantages in that different wavelengths of light can be applied to the secondary cores. Often, a false alarm is signalled by a perturbation at only one wavelength. However, by applying different wavelengths of light to the different alarm cores, a perturbation at all of the different wavelengths will signify a true intrusion upon the optical waveguide.

In one embodiment, the optical fiber has a decreasing refractive index profile with distance from the axis of the fiber. Alternatively, the cores are concentric rings, and rings of high refractive index may be separated by rings of lower refractive index.

In accordance with another aspect of the invention, the presence of a bend is detected because the relative light loss from a second core is very much greater than the light loss from a direct core. This is made possible because the relative index difference between the second core and the cladding, $$\Delta_{23} \simeq \frac{n_2 - n_3}{n_2},$$

is substantially less than the relative index difference between the first core and its cladding, $$\Delta_{13} \simeq \frac{n_1 - n_3}{n_1},$$

where $n_1$ is the index of refraction of the first core, $n_2$ is the index of refraction of the second core and $n_3$ is the index of refraction of the cladding.

The foregoing and other objects, features and advantages of the invention will be better understood from the following more detailed description and appended claims.

DESCRIPTION OF THE DRAWINGS

FIG. 6 shows the waveguide in a communication system in which different wavelengths of light are applied to the secondary cores.

DESCRIPTION OF PARTICULAR EMBODIMENTS

Figure 1A:
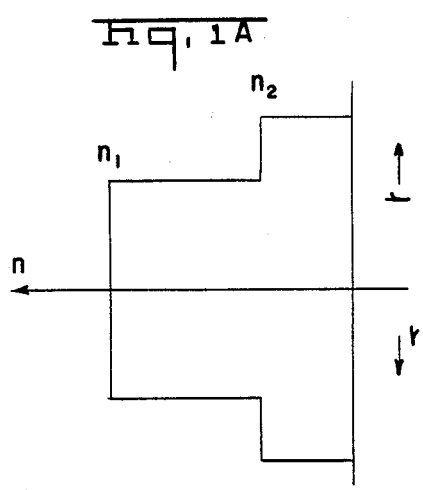
FIG. 1 depicts a prior art optical waveguide and FIG. 1A shows the radial refractive index profile for this waveguide.
Figure 1:
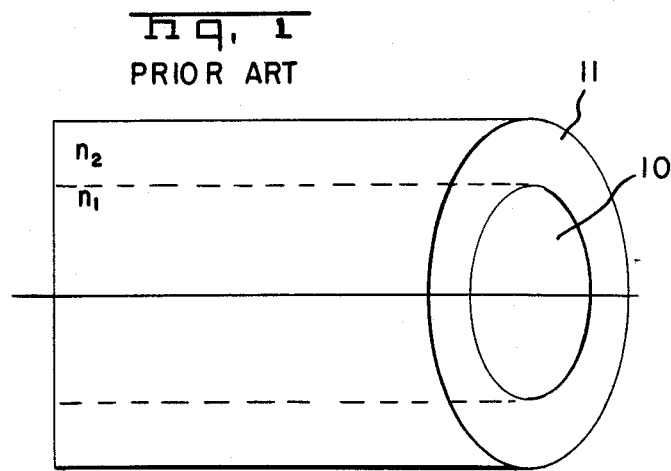

Referring to FIG. 1, a normal optical waveguide includes a core 10 having an index of refraction $n_1$ surrounded by a cladding layer 11 having a lower index of refraction $n_2$. A radial refractive index profile for this waveguide is shown in FIG. 1A which depicts refractive index as abscissa and radial distance from the axis of the waveguide as ordinate. It has been shown that, in the presence of random bends, the light lost from the waveguide is inversely proportional to a power of the relative core cladding index difference, $$\Delta_{12} \approx \frac{n_1 - n_2}{n_1}.$$

The loss coefficient for multiple mode waveguides is given by:

$$\gamma(db) = K \frac{a^{2p}}{\Delta_{12}^{p+1}}$$

where a is core radius and p is a quantity dependent upon the nature of the bend. Typically it has a value, $0 < p < 2$. See R. Olshansky, App. Opt. 14, No. 4, 935 (1975).

Figure 2A:
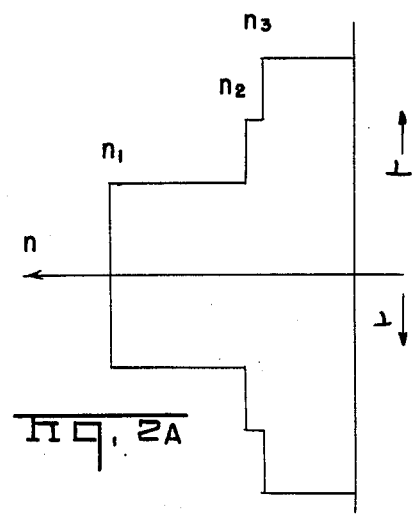
FIG. 2 shows a multiple core waveguide in accordance with this invention and FIG. 2A shows the radial refractive index profile for this waveguide.
Figure 2:
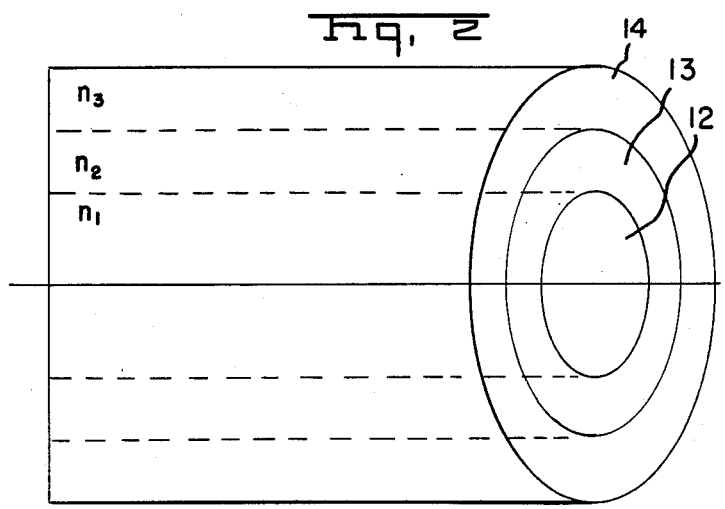

In accordance with one embodiment of this invention, a multiple core waveguide is constructed as depicted in FIG. 2. It includes a first core 12, at least one second core 13 and a cladding 14. Light is propagated in at least cores 12 and 13. The refractive index profile is shown in FIG. 2A. The refractive index $n_1$ of the first core is greater than the refractive index $n_2$ of the second core. The indices of refraction of both cores are greater than the index of refraction of the cladding $n_3$. In the presence of a bend, the relative loss from the second core 13 is much greater than the loss from the first core 12 if $\Delta_{23}$ is substantially less than $\Delta_{12}$.

In accordance with this invention, intrusion can be detected by monitoring the signals in the cores 12 and 13. If the ratio of light loss between the two cores changes, this indicates an intrusion.

Other multiple core waveguides will similarly exhibit a change in the ratio of light loss in the presence of perturbations.

Figure 3A:
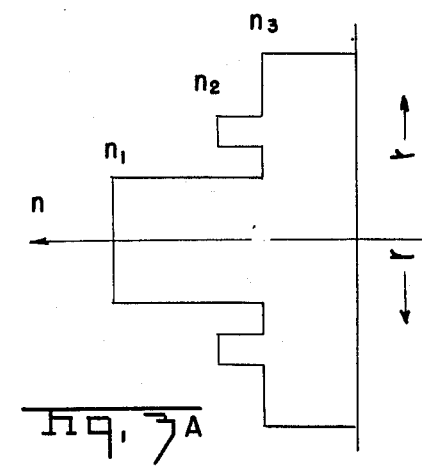
FIG. 3 shows another embodiment of the invention and FIG. 3A shows the radial refractive index profile for this waveguide.
Figure 3:
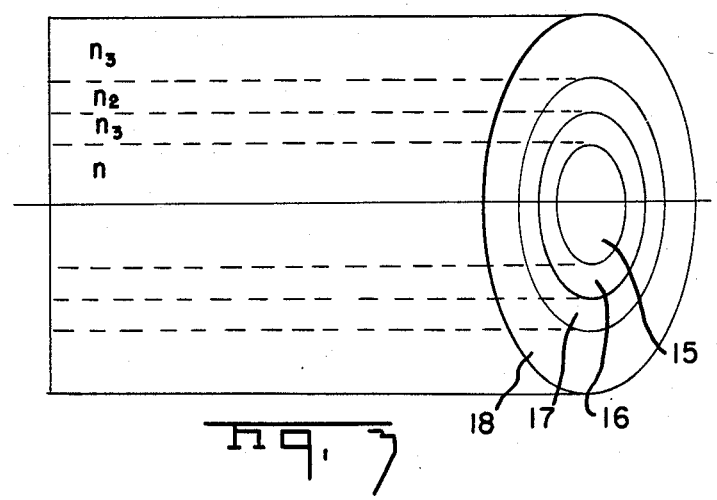

FIG. 3 shows a ring type guide surrounding a conventional guide. The conventional guide includes a core 15 and a cladding 16. The ring guide includes a second core 17 and a cladding 18. The refractive index profile is shown in FIG. 3A.

Figure 4:
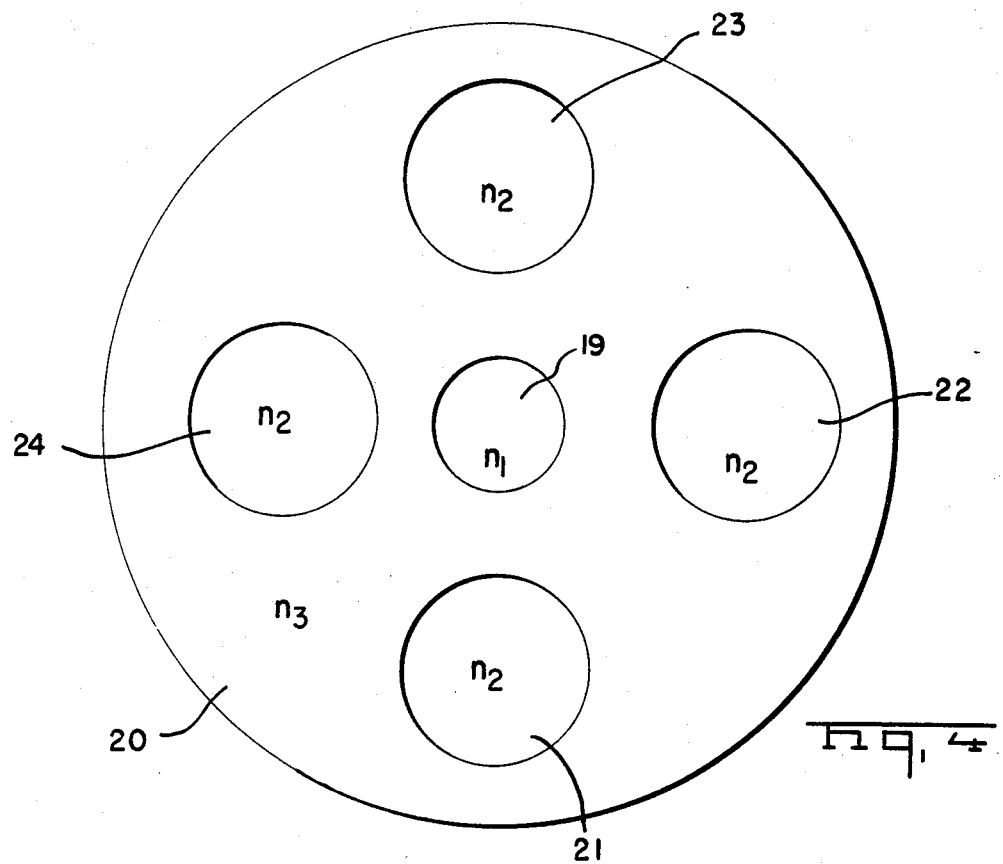
FIG. 4 shows another embodiment of the invention.

FIG. 4 shows the preferred embodiment wherein the first core 19 is coaxial with the cladding 20 and wherein a plurality of second cores 21-24 are disposed around the first core 19. The index of refraction of core 19 is greater than the index of refraction of the cladding 20. Core 19 forms a primary channel. The surrounding cores 21-24 have an index of refraction which is also greater than that of the cladding 20. By proper choice of the core diameters, the refractive index difference and the propagating light wavelength for the primary and secondary channels, the secondary channels 21-24 can be made more susceptible to distortion loss. This can readily be illustrated for the case of the channels being single mode waveguides. Then the radial power distribution in the region surrounding the waveguide core is shown by Marcuse in "Theory of Dielectric Optical Waveguides," Academic Press 1974, to be:

$$P(r) = P(a)e^{-\gamma r}$$

where P(a) is the power at the core-cladding interface. The quantity $\gamma$ depends on the V-parameter of the waveguide $$\gamma \approx \frac{V}{a} \left| 1 - \left(\frac{V_c}{V}\right)^2 e^{-2/V} \right|^{\frac{1}{2}}$$

where $V_c$ is the mode cutoff value, ($V_c = 2.405$ for single mode operation) and for a step index profile, $$V = \frac{2\pi a}{\lambda}(n_1^2 - n_2^2)^{\frac{1}{2}}$$

By proper choice of the parameters a, n, and $\gamma$, V may be adjusted to make P(r) comparatively large for large V in the secondary channels. This in turn makes the channels including cores 21-24 much more susceptible to distortion losses. By detecting the ratio of the loss in any one of the cores 21-24 to the loss in the primary channel 19, a perturbation in the fiber can be identified. A similar analysis shows that multiple mode waveguides exhibit a loss ratio when perturbed.

In accordance with the present invention, the relative index difference for the primary channel is substantially greater than the index difference for the secondary channels. Alternatively, for multimode waveguides, the diameter of the primary core 19 is substantially less than the diameter of the secondary cores 21-24. Alternatively, the waveguide of light transmitted in the primary core 19 is substantially lower than the wavelength of light transmitted in the secondary cores 21-24. As used herein, the word "substantially" means a difference in waveguide parameters such that the loss difference between the primary and secondary core is at least an order of magnitude of difference. In the case of index differences, the index difference for the primary cores is at least twice the index difference for the secondary cores.

For a typical $SiO_2$-$GeO_2$-$P_2O_5$ multimode waveguide, the index difference $\Delta_{13}$ is 0.01 whereas waveguides with an index difference $\Delta_{23}$ less than about 0.005 have been observed to give rise to an order of magnitude greater relative loss for the core 23 than the core 13 in the presence of random bends. Of course these values are not unique as suggested by the equation on page 4. The ratio of the core and cladding $\Delta$-value must be on this order, however.

In the case of core diameters the typical diameter of a multimode core is 50 $\mu$m. If this value is chosen for the primary core, the secondary core diameters must be greater than approximately 90 $\mu$m in order to exhibit an order of magnitude loss difference when subjected to a perturbation with $p = 1.85$ which is quite typical.

In the case of single mode waveguides there exists an inseparable relationship between $\alpha$, $\Delta$ and $\lambda$. Typical values for a single mode waveguide might be $\Delta_{13} = 0.005$ and $\Delta_{23} \leq 0.004$ with a common core diameter of $2a = 10$ $\mu$m and corresponding cutoff wavelengths of $\lambda_{c13} = 1300$ nm and $\lambda_{c23} \lesssim 1170$ nm respectively. These values will produce approximately an order of magnitude greater relative loss when both guides are operated at $\lambda \cong 1750$ nm.

Alternatively, one could consider identical single mode primary and secondary waveguides with $\Delta_{13} = \Delta_{23} = 0.004$ and $2a = 10$ $\mu$m, but propagating different wavelengths. If for example, $\lambda_{13} \lesssim 1730$ nm and $\lambda_{23} \gtrsim 1840$ nm, an order of magnitude greater loss can exist for the same perturbation. Generally speaking, the exact transmission wavelength can be altered for different values of the waveguide parameters $\Delta_{13}$, $\Delta_{23}$, $2a_{13}$, and $2a_{23}$ but in all cases, the wavelength for the second core will be greater than the primary core. For the wavelengths typically used in telecommunications systems this difference may be on the order of 100 nm or more although as is known to one skilled in the art in proper design of the individual parameters the wavelength difference may be made arbitrarily small.

It should be understood that although the three single mode cases considered above involved holding all waveguide parameters, $\Delta$, $2a$ and $\lambda$, fixed but one (e.g., $\Delta_{13} \neq \Delta_{23}$), there is complete freedom to choose different values for all parameters and still arrive at a substantially different loss characteristic of the two cores when subjected to a common bend.

Figure 5:
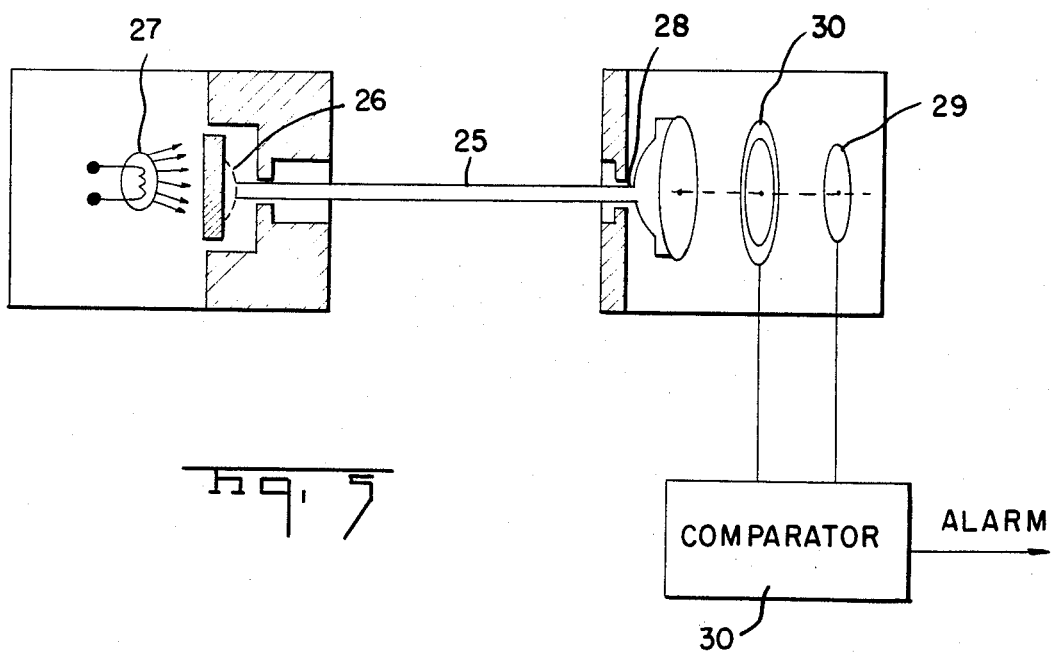
FIG. 5 shows a waveguide of this invention in a secure communication system.

FIG. 5 shows a typical waveguide 25 of this invention in a secure communication system. The input end 26 of the waveguide is optically coupled to a variable intensity light source 27 which propagates light signals along the waveguide. Although not shown, a number of light sources can be modulated to propagate signals along the multiple cores of the waveguide. The output end 28 of the waveguide is optically coupled to light detectors 29 and 30. These detectors respectively detect light signals traveling along the first and second cores of the waveguide shown in FIG. 2, as an example. In order to detect the perturbation of the waveguide 25 the comparator 30 compares the relative signals from detectors 29 and 30. When the ratio of these signals changes significantly, an alarm is indicated.

In FIG. 6, the preferred multi-core parallel axis waveguide of FIG. 4 is shown in a communication system. Light sources emitting light of wavelengths, $\lambda_1$, $\lambda_2$, $\lambda_3$ ... $\lambda_5$ are applied to the primary channel 19 and the secondary channels 21-24, respectively. Light on these channels is conducted over the waveguide 25 to the far end at which the detectors 32-36 receive the transmitted light. The comparator 37 compares the output of all of the secondary cores to the output of the primary core. Only if a significant change in transmitted light is shown at all of the transmitted wavelengths is an error indicated. In this manner, false alarms, occasioned for example by a perturbation at only one wavelength, will be avoided.

While step index waveguides have been shown in the drawings, gradient index waveguides such as described in U.S. Pat. No. 3,823,995—Carpenter can be used.

While particular embodiments of the invention have been shown and described, various modifications are within the true spirit and scope of the invention. The appended claims are, therefore, intended to cover all such modifications.

What is claimed is:

1. A glass optical waveguide comprising:
a primary core having a first index of refraction:
a plurality of other cores having axes parallel to and outside of said primary core, said other cores having a different index of refraction than said first index, the index of refraction of at least two adjacent other cores being the same; and
a common cladding surrounding all of said cores, the index of refraction of each core being greater than the index of refraction of said cladding.

2. The glass optical waveguide recited in claim 1 in a communication system for detecting intrusion upon said optical waveguide comprising:
means for propagating and detecting light signals along said optical waveguide; and
means for detecting a change in said relative light loss between said primary core and said other cores to identify perturbation of said waveguide.

3. The system recited in claim 2 wherein said means for propagating light signals includes means for applying different wavelengths of light to different ones of said other cores and wherein said means for detecting includes means for detecting a change in said relative light loss between said primary and secondary cores at different wavelengths.

4. The system recited in claim 2 wherein said means for propagating includes means for propagating light in said other cores having a longer wavelength than the light propagated in said primary cores.

5. The optical waveguide recited in claim 1 wherein the index of refraction of said primary core is substantially greater than the index of refraction of said other cores.

6. The optical waveguide recited in claim 1 wherein said other cores have a diameter which is substantially greater than the diameter of said primary core.

7. The waveguide recited in claim 1 wherein the relative index difference between said other cores and said cladding $$\Delta_{23} \simeq \frac{n_2 - n_3}{n_2}$$

is substantially less than the index difference $$\Delta_{13} \simeq \frac{n_1 - n_3}{n_1}$$

where $n_1$ is the index of refraction of said first core, $n_2$ is the index of refraction of said other cores and $n_3$ is the index of refraction of said cladding.

8. A multiple core optical waveguide comprising:
at least primary and secondary glass cores having parallel separated axes and a common cladding, the index of refraction of all cores being greater than the index of refraction of said cladding and the index of refraction of said primary core being substantially greater than the index of refraction of said secondary core, the relative index difference between said secondary core and said cladding, $$\Delta_{23} \simeq \frac{n_2 - n_3}{n_2}$$

being substantially less than the index difference $$\Delta_{13} \simeq \frac{n_1 - n_3}{n_1}$$

where $n_1$ is the index of refraction of said primary core, $n_2$ is the index of refraction of said secondary core, and $n_3$ is the index of refraction of said cladding.

9. The apparatus recited in claim 8 wherein said primary core is coaxial with said cladding and a plurality of secondary cores are disposed around said primary core.

10. The apparatus recited in claim 8 wherein said optical waveguide cores have a decreasing refractive index profile with distance from the axis.

11. Apparatus for detecting intrusion upon an optical waveguide communication system comprising:

a glass optical waveguide having multiple cores and cladding, the index of refraction of each core being greater than the index of refraction of its cladding, the relative light loss between a primary core and a secondary core being much different upon perturbation of the waveguide because of a substantial difference in at least one of the following: the relative core cladding index difference, wherein the index of refraction of said primary core is substantially greater than the index of refraction of said secondary core, wavelengths of light transmitted in the cores, and diameters of said primary and secondary cores;

means for propagating and detecting light signals along said optical waveguide; and means for detecting a change in said relative light loss between said primary and secondary cores to identify perturbation of said optical fiber.

12. The apparatus recited in claim 11 wherein said primary and secondary cores have parallel separated axes within the same cladding.

13. The apparatus recited in claim 12 wherein said primary core is coaxial with said cladding and a plurality of secondary cores are disposed around said first core.

14. The apparatus recited in claim 11 wherein said primary core has a substantially smaller diameter than said secondary core.

15. The apparatus recited in claim 11 wherein each core sustains a single mode of propagation.

16. The apparatus recited in claim 11 wherein each core sustains multiple modes of propagation.

17. The apparatus recited in claim 11 wherein said primary and secondary cores are coaxial.

18. The apparatus recited in claim 11 wherein said optical waveguide cores have a decreasing refractive index profile with distance from the axis of said cores.

19. The apparatus recited in claim 11 wherein said primary and secondary cores are coaxial rings of different refractive index glass.

20. The apparatus recited in claim 11 wherein the relative index difference between said secondary core and said cladding $$\Delta_{23} \approx \frac{n_2 - n_3}{n_2}$$

is substantially less than the index difference $$\Delta_{13} \approx \frac{n_1 - n_3}{n_1}$$

where $n_1$ is the index of refraction of said primary core, $n_2$ is the index of refraction of said secondary core and $n_3$ is the index of refraction of said cladding.

21. The apparatus recited in claim 11 wherein the relative index difference between said secondary core and said cladding $$\Delta_{23} \approx \frac{n_2 - n_3}{n_2}$$

is substantially less than the index difference $$\Delta_{12} \approx \frac{n_1 - n_2}{n_1}$$

where $n_1$ is the index of refraction of said primary core, $n_2$ is the index of refraction of said secondary core and $n_3$ is the index of refraction of said cladding.

* * * * *